Oct. 24, 1933.  D. W. McLENEGAN  1,932,280
METHOD OF AND MEANS FOR STARTING ALTERNATING CURRENT MOTORS
Filed Nov. 21, 1930
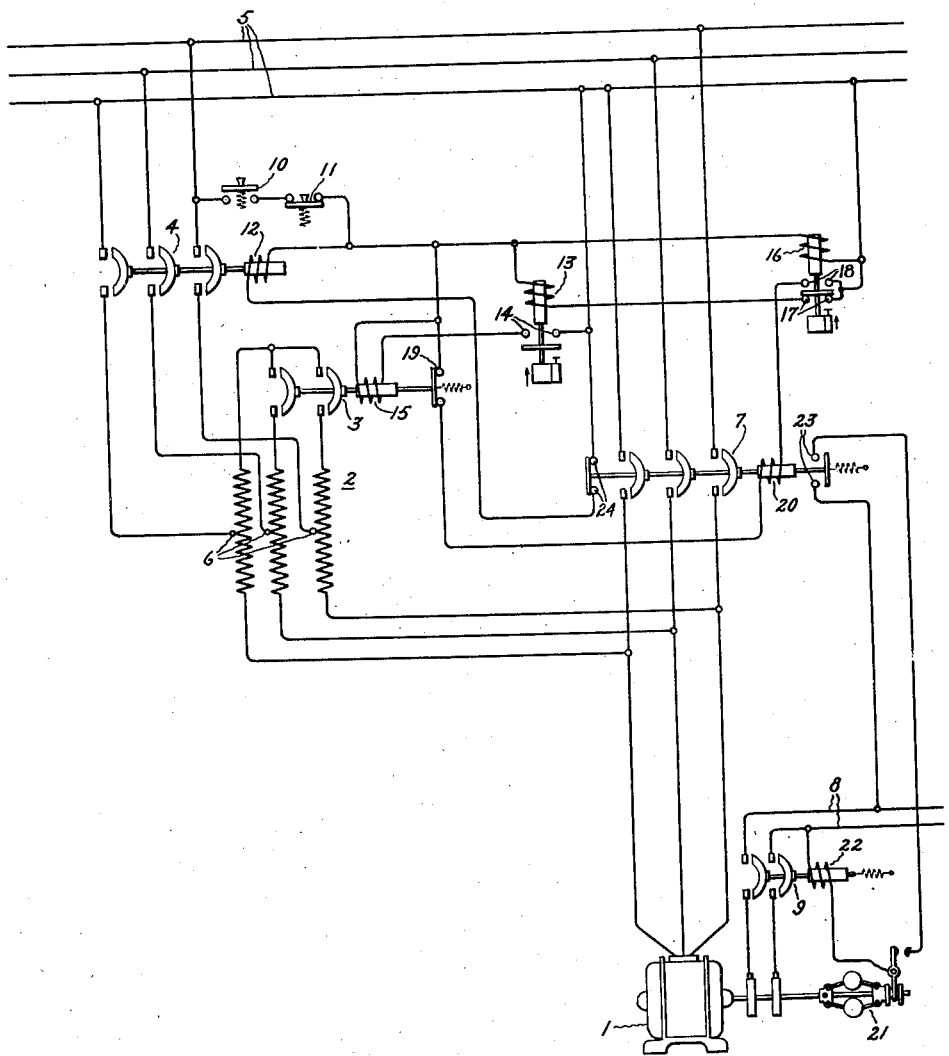
Inventor:
David W. McLenegan,
by Charles V. Tullar
His Attorney.

Patented Oct. 24, 1933

1,932,280

UNITED STATES PATENT OFFICE 1,932,280

METHOD OF AND MEANS FOR STARTING ALTERNATING CURRENT MOTORS

David W. McLenegan, Schenectady, N. Y., assignor to General Electric Company, a corporation of New York Application November 21, 1930
Serial No. 497,212

5 Claims. (Cl. 172—289)

My invention relates to the starting of alternating current motors and particularly synchronous motors and has for its object the provision of a simple and reliable method of and means for starting alternating current motors requiring high starting torque whereby mechanical strains on the various elements driven by the motor such as gears, belts, couplings, etc., are avoided.

In accordance with my invention, I provide a method of starting and an arrangement of parts whereby a relatively low voltage is first applied to the motor to take up all the clearance in the mechanism driven by the motor and then, without interrupting the supply of current to the motor, a relatively high voltage is applied to the motor to produce the necessary starting torque to bring the motor up to speed, after which the transfer to normal voltage is effected while the motor still remains connected to the supply circuit.

My invention will be better understood from the following description when taken in connection with the accompanying drawing which illustrates diagrammatically a starting system for a synchronous motor and its scope will be pointed out in the appended claims.

Referring to the drawing, 1 represents a synchronous motor the armature winding of which is shown permanently connected to one set of terminals of a three-phase auto-transformer 2. The other set of terminals of the auto-transformer is arranged to be connected together by a switch 3. A switch 4 is provided for connecting a suitable alternating current supply circuit 5 to intermediate taps 6 on the auto-transformer 2. Therefore with the arrangement shown in the drawing the closing of the switch 4 while the switch 3 is open applies to the motor armature winding a voltage less than the supply circuit voltage, this reduced voltage being equal to the supply circuit voltage less the voltage drop in the lower portion of the auto-transformer winding, which acts as a series reactor. When both of the switches 3 and 4 are closed, however, voltage in excess of the supply circuit voltage is applied to the motor armature winding by the auto-transformer.

A third switch 7 is also provided for connecting the motor armature winding directly to the supply circuit 5.

The field winding of the motor is arranged to be connected to a suitable source of excitation 8 by means of a field switch 9.

In accordance with my improved method of starting a synchronous motor, I first close the switch 4 so that a portion of the auto-transformer 2 acts as a series reactor between the supply circuit 5 and the motor armature winding and, therefore, a voltage less than the supply circuit voltage is applied to the motor. This voltage is sufficient to take up the slack in the mechanism driven by the motor. The switch 3 is then closed so that the voltage applied to the motor is increased to a value in excess of the supply circuit voltage. This high voltage causes the motor to develop sufficient torque to start it and the load connected thereto and bring them up to approximately synchronous speed. Then the switch 3 is opened to reestablish the initial starting connections and subsequently the switch 7 is closed to connect the motor armature winding directly to the supply circuit 5 after which the switch 4 is opened. When the switch 3 is reopened the voltage applied to the motor is higher than when the switch 4 was initially closed because the motor is operating at a higher speed and therefore the armature current is less than the initial starting current. Consequently, less drop is produced in the auto-transformer windings.

In accordance with my improved method of starting a synchronous motor, it will be seen that all of the changes in the voltage applied to the motor, after the initial closing of the switch 4 are made without interrupting the supply of current to the motor. This is a very important feature as it avoids all mechanical shocks during the starting operation of the motor.

The closing of the field switch 9 may be effected at any desired point during the starting operation. In some cases it is desirable to close the field switch 9 while the motor armature winding has the high voltage applied thereto. In other cases it is desirable to close the field switch after the switch 7 has been closed to establish the normal running connections of the motor.

In the drawing I have also shown an arrangement for automatically controlling the operation of the switches 3, 4, 7 and 9 so that they are closed in the proper sequence to perform my new method of starting an alternating current motor. As shown, the arrangement includes a manually controlled switch 10 which, when closed, effects the starting of the motor and a manually controlled stop switch 11 which when opened, effects the shutting down of the motor. The starting switch 10, when closed, effects the energization of the closing coil 12 of the switch 4 and also the energization of a time relay 13 which, after being energized for a predetermined time, closes its contacts 14 and completes an energizing circuit for the closing coil 15 of the switch 3. The closing of the starting switch 10 also completes an energizing circuit for a time relay 16 which has a relatively long time setting so that it does not open its contacts 17 and close its contacts 18 until after the abnormally high voltage has been applied to the motor for a sufficient length of time to bring it up to a desired speed. When the relay 16 operates, the opening of its contacts 17 deenergizes the time relay 13 which, in turn, effects the deenergization of the closing coil 15 so that the switch 3 opens. The closing of the auxiliary contacts 19 on the switch 3, when it opens, completes, through the contacts 18 of the time relay 16, an energizing circuit for the closing coil 20 of the switch 7 so that the voltage of the supply circuit 5 is applied directly to the motor 1. The opening of the auxiliary contacts 24 on the switch 7 deenergizes the closing coil 12 of the switch 4 so that it opens and disconnects the taps 6 of the auto-transformer 2 from the supply circuit 5.

In the arrangement shown, the closing of the field switch 9 is effected by means of a centrifugally operated speed switch 21 which is arranged to complete an energizing circuit for the closing coil 22 of the field switch 9 when the motor speed is above a predetermined value. The circuit of the closing coil 22 also includes the auxiliary contacts 23 on the switch 7 so that the motor field winding is not excited until after normal voltage is applied to the motor. In case it is desired to energize the motor field winding while the motor is being supplied with the abnormally high voltage, the contacts 23 in the circuit of the closing coil 22 may be omitted and the time setting of the time relay 16 adjusted so that the relay does not operate until after the motor has had time to reach a speed sufficient to cause the centrifugally operated switch 21 to close its contacts and complete the energizing circuit for the closing coil 22. This result can also be accomplished by providing the field switch 9 with auxiliary contacts in the circuit of the winding of relay 16 so that it cannot be energized until after the field switch is closed.

In order to simplify the disclosure, I have shown a centrifugally operated switch 21 as the means for controlling the field switch 9 in response to the speed of the motor 1 but it will be obvious to those skilled in the art that any other suitable speed responsive means, examples of which are well known in the art, may be employed in place of the centrifugally operated switch 21.

The operation of the arrangement shown in the drawing is as follows: When the starting switch 10 is closed, the closing coil 12 is energized to close the switch 4 so that a voltage less than the supply circuit voltage is applied to the motor. A short time after the switch 4 closes the time relay 13 effects the closing of the switch 3 so that the voltage applied to the motor is increased to a value in excess of the supply circuit voltage. The motor then starts and comes up to synchronous speed after which the time relay 16 operates to effect the opening of the switch 3 so as to reestablish the initial starting connections. Then the switch 7 closes to connect the motor 1 directly to the supply circuit 5. The closing of the switch 7 also effects the opening of the switch 4 and the closing of the field switch 9.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. The step in the method of starting a polyphase motor which consists in connecting a polyphase supply circuit to intermediate taps on a polyphase auto-transformer which has one set of its end terminals connected to the line terminals of the armature winding of said motor so that a portion of said auto-transformer operates as a series reactor and then connecting together the other end terminals of said auto-transformer so that a voltage in excess of the supply circuit voltage is applied to the motor armature winding.

2. The method of starting a polyphase motor which consists in connecting a polyphase supply circuit to intermediate taps on a polyphase auto-transformer which has one set of its end terminals connected to the line terminals of the armature winding of said motor, then connecting together the other end terminals of said auto-transformer, then disconnecting from each other said last mentioned terminals of said auto-transformer, and then connecting the line terminals of the motor armature winding directly to the supply circuit.

3. The method of starting a polyphase motor which consists in connecting a polyphase supply circuit to intermediate taps on a polyphase auto-transformer which has one set of its end terminals connected to the line terminals of the armature winding of said motor, then connecting together the other end terminals of said auto-transformer, then disconnecting from each other said last-mentioned terminals of said auto-transformer, and then connecting the line terminals of the motor armature winding directly to the supply circuit and disconnecting said supply circuit from the intermediate taps of said auto-transformer.

4. In combination, an alternating current motor, a polyphase supply circuit, a polyphase auto-transformer having one of its sets of end terminals connected to the line terminals of the armature winding of said motor, a switch for connecting said supply circuit to intermediate taps on said auto-transformer, a second switch for interconnecting the other end terminals of said auto-transformer, a third switch for connecting the line terminals of the motor armature winding directly to the supply circuit, and means for sequentially operating said switches so that said first mentioned switch is closed, then said second switch is closed and opened, and then said third switch is closed.

5. In combination, an alternating current motor, a polyphase supply circuit, a polyphase auto-transformer having one of its sets of end terminals connected to the line terminals of the armature winding of said motor, a switch for connecting said supply circuit to intermediate taps on said auto-transformer, a second switch for interconnecting the other end terminals of said auto-transformer, and means for sequentially operating said switches so that said first mentioned switch is closed and then said second switch is closed.

DAVID W. McLENEGAN.